(12) United States Patent
Gisolf et al.

(10) Patent No.: US 12,298,242 B2
(45) Date of Patent: May 13, 2025

(54) SYSTEMS AND METHODS FOR DIFFERENTIATING BUBBLE POINTS FROM DEW POINTS

(71) Applicant: Schlumberger Technology Corporation, Sugar Land, TX (US)

(72) Inventors: Adriaan Gisolf, Ilvof (RO); Oliver Mullins, Houston, TX (US); Shahnawaz Hossain Molla, Acton, MA (US); Francois Xavier Dubost, Montpellier (FR); Hadrien Dumont, Paris (FR); Vladislav Achourov, Stavanger (NO)

(73) Assignee: Schlumberger Technology Corporation, Sugar Land, AS (US)

( * ) Notice: Subject to any disclaimer, the term of this patent is extended or adjusted under 35 U.S.C. 154(b) by 0 days.

(21) Appl. No.: 18/725,712

(22) PCT Filed: Jun. 23, 2023

(86) PCT No.: PCT/US2023/026130
§ 371 (c)(1),
(2) Date: Jun. 28, 2024

(87) PCT Pub. No.: WO2023/250176
PCT Pub. Date: Dec. 28, 2023

(65) Prior Publication Data
US 2024/0418646 A1    Dec. 19, 2024

Related U.S. Application Data (60) Provisional application No. 63/366,944, filed on Jun. 24, 2022.

(51) Int. Cl.
G01N 21/53 (2006.01)
E21B 49/10 (2006.01)
G01N 21/85 (2006.01)

(52) U.S. Cl.
CPC ............ G01N 21/53 (2013.01); E21B 49/10 (2013.01); G01N 21/8507 (2013.01); *G01N 2021/855* (2013.01)

(58) Field of Classification Search
CPC ............... G01N 21/53; G01N 21/8507; G01N 2021/855; E21B 49/10
See application file for complete search history.

(56) References Cited

U.S. PATENT DOCUMENTS

| | | |
|---|---|---|
| 2007/0214877 A1 | 9/2007 | Shammai |
| 2010/0012316 A1 | 1/2010 | Schlachter |
| 2010/0313647 A1 | 12/2010 | Terabayashi et al. |

(Continued)

OTHER PUBLICATIONS

Gisolf et al., (2022) In Situ Bubblepoint Measurement, SPE-210280-MS, SPE Annual Technical Conference and Exhibition in Houston TX, USA, Oct. 3-5, 2022 (13 pages).

(Continued)

*Primary Examiner* — David Z Huang
*Assistant Examiner* — Jean F Morello
(74) *Attorney, Agent, or Firm* — Jeffrey D. Frantz (57) ABSTRACT

Systems and methods presented herein generally relate to a formation testing tool configured to determine whether a formation fluid being tested is a bubble point fluid or a dew point fluid. For example, in certain embodiments, a method includes depressurizing a flowline of a formation testing tool. The flowline contains a formation fluid having a gas-to-oil ratio (GOR) within a predetermined GOR range. The method also includes determining, using a fluid analysis module of the formation testing tool, whether the formation fluid is a bubble point fluid or a dew point fluid by analyzing distribution of bubbles in the formation fluid that are caused by the depressurization of the flowline.

16 Claims, 8 Drawing Sheets

(56) References Cited

U.S. PATENT DOCUMENTS

2013/0219997 A1    8/2013   Sullivan et al.
2015/0114627 A1    4/2015   Tjhang et al.

OTHER PUBLICATIONS

Dumont et al., (2016) Asphaltene And Saturation Pressure Detection with DFA While Pulling Out of Hole on Wireline, SPWLA 57th Annual Logging Symposium, Jun. 25-29, 2016 (12 pages).
Rashid et al., (2019) A downhole Wireline Module for the Measurement of Bubble Point Pressure, Abu Dhabi, UAE, Nov. 11-14, 2019, SPE-197927-MS (16 pages).
Hashmi et al., (2021) Sandface measurement of asphaltene precipitation to determine its onset, SPWLA, The 26th Formation Evaluation Symposium of Japan (5 pages).
International Search Report and Written Opinion issued in International Patent Appl. No. PCT/US2023/026130 on Oct. 17, 2023; 11 pages.
International Preliminary Report on Patentability issued in the PCT Application No. PCT/US2023/026130 dated Jan. 2, 2025, 7 pages.

SYSTEMS AND METHODS FOR DIFFERENTIATING BUBBLE POINTS FROM DEW POINTS

CROSS-REFERENCE TO RELATED APPLICATIONS

This application is the National Stage Entry of International Application No. PCT/US2023/026130, filed Jun. 23, 2023, which claims priority to U.S. Provisional Patent Application Ser. No. 63/366,944, filed Jun. 24, 2022, entitled: "Systems and Methods for Differentiating Bubble Points from Dew Points", and each of the above applications is incorporated herein by reference in its entirety.

BACKGROUND

The present disclosure generally relates to a formation testing tool configured to determine whether a formation fluid being tested is a bubble point fluid or a dew point fluid.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Formation tester flowline decompression experiments may be performed in minutes, at any time, and on a wide range of downhole fluids. Saturation pressure detection generally consists of two parts: (1) dropping the pressure below saturation pressure, and (2) detecting the phase change. After isolation of a volume of contamination-free fluid in a fluid analysis module of a formation testing tool, a downhole pump may be used to reduce flowline pressure at a relatively low and precise flow rate. The phase change may then be detected using optical spectroscopy measurements. With pressure reduction, bubble point fluids exhibit formation of a new gas phase from the dominant fluid, whereas dew point fluids exhibit formation of a new liquid phase from the dominant fluid. Even very small bubbles or dew drops scatter visible and near-infrared light directed through the flowline, ensuring that the phase change event is detected.

Fluids that have a relatively low gas-to-oil ratio (GOR) and relatively high density are typically known to be bubble point fluids. Similarly, fluids with a relatively high GOR and relatively low density are known to be dew point fluids. However, for fluids in the range between, for example, 2,500 standard cubic feet of gas per barrel of oil (scf/bbl) and 5,000 scf/bbl, the downhole fluid analysis measurements often struggles to differentiate bubble point fluid fluids from dew point fluids. Nevertheless, it is relatively important for efficient production from a field to know if the oilfield contains bubble point fluids or dew point fluids.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes depressurizing a flowline of a formation testing tool. The flowline contains a formation fluid. The method also includes determining, using a fluid analysis module of the formation testing tool, whether the formation fluid is a bubble point fluid or a dew point fluid by analyzing distribution of bubbles in the formation fluid that are caused by the depressurization of the flowline.

Certain embodiments of the present disclosure also include a formation testing tool that includes a flowline configured to receive a formation fluid. The formation testing tool also includes a hydraulic module configured to depressurize a flowline of the formation testing tool. The formation testing tool further includes a fluid analysis module configured to determine whether the formation fluid is a bubble point fluid or a dew point fluid by analyzing distribution of bubbles in the formation fluid that are caused by the depressurization of the flowline.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequently, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention).

Figure 1:
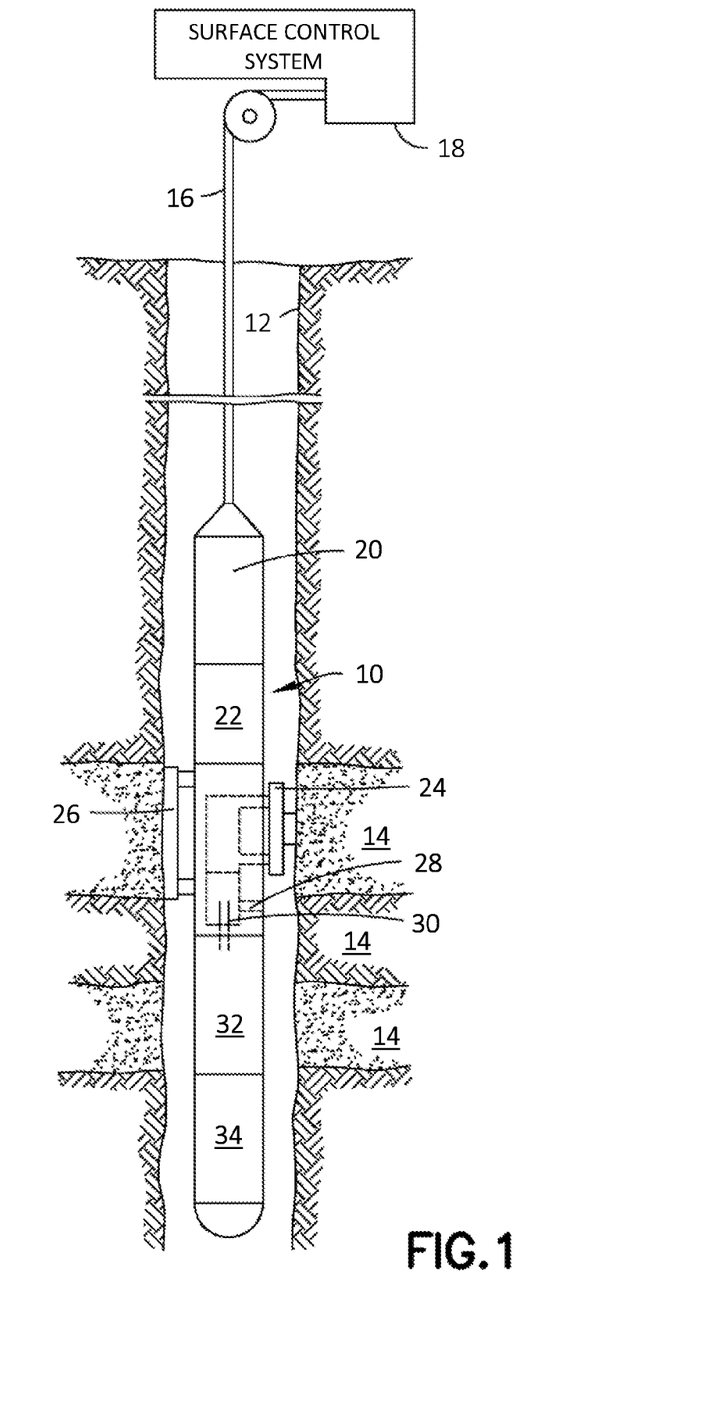
FIG. 1 is a schematic diagram of a formation testing tool, in accordance with embodiments of the present disclosure.

The embodiments described herein include systems and methods for differentiating dew points from bubble points during formation tester flowline decompression experiments. FIG. 1 illustrates a formation testing tool 10 that enables such analysis. As illustrated, in certain embodiments, the formation testing tool 10 may be suspended in a wellbore 12 traversing a formation 14 by a cable 16 (e.g., a wireline cable) that is spooled in a usual fashion on a suitable winch (not shown) on the formation surface. On the surface, the cable 16 may be electrically coupled to a surface control system 18. Although illustrated in FIG. 1 as being a cable conveyance system, in other embodiments, a drill pipe conveyance system may be used to convey the formation testing tool 10 into and out of the wellbore 12.

As illustrated, in certain embodiments, the formation testing tool 10 includes an elongated body 20 that encloses a tool control system 22. In certain embodiments, the elongated body 20 also includes a fluid admitting assembly 24 and a tool anchoring member 26, which may be arranged on opposite lateral sides of the body 20. In certain embodiments, the fluid admitting assembly 24 is configured to selectively seal off or isolate selected portions of the wall of the wellbore 12 such that pressure or fluid communication with the adjacent formation 14 is established. In addition, in certain embodiments, the formation testing tool 10 includes a fluid analysis module 28 with a flowline 30 through which fluid collected from the formation 14 flows. The fluid may thereafter be expelled through a port (not shown) or may be directed to one or more fluid collecting chambers 32, 34, which may receive and retain the fluids collected from the formation 14. As described in greater detail herein, the fluid admitting assembly 24, the fluid analysis module 28, and the flow path to the fluid collecting chambers 32, 34 may be controlled by the control systems 18, 22. As described in greater detail herein, the fluid analysis module 28 may be configured to differentiate dew point fluids flowing through the flowline 30 from bubble point fluids flowing through the flowline 30. Further, the fluid analysis module 28 may be configured to differentiate dew point fluids from bubble point fluids in real time while the formation testing tool 10 is downhole.

Figure 2:
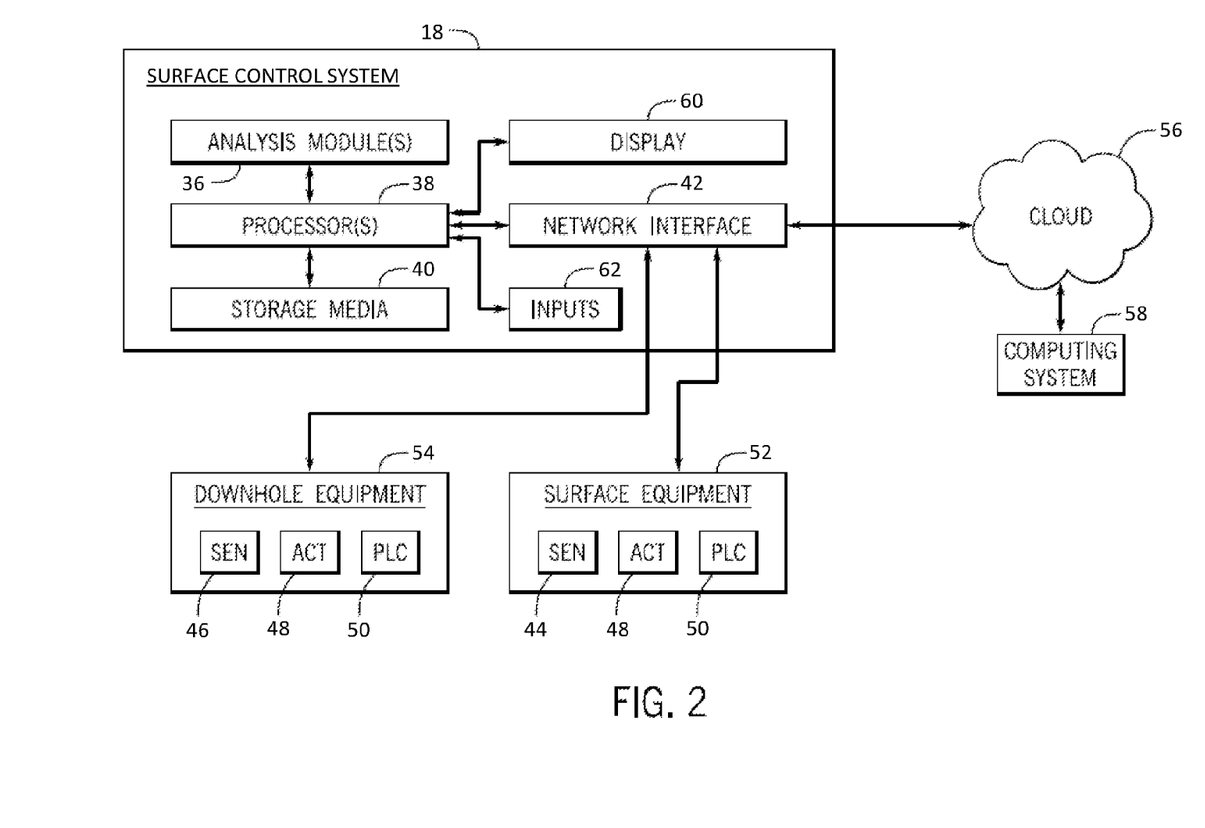
FIG. 2 illustrates a surface control system that may control the oil and gas well system of FIG. 1, in accordance with embodiments of the present disclosure.

FIG. 2 illustrates an embodiment of the surface control system 18 illustrated in FIG. 1. In certain embodiments, the surface control system 18 may include one or more analysis modules 36 (e.g., a program of processor executable instructions and associated data) that may be configured to perform various functions of the embodiments described herein. In certain embodiments, to perform these various functions, an analysis module 36 executes on one or more processors 38 of the surface control system 18, which may be connected to one or more storage media 40 of the surface control system 18. Indeed, in certain embodiments, the one or more analysis modules 36 may be stored in the one or more storage media 40.

In certain embodiments, the one or more processors 38 may include a microprocessor, a microcontroller, a processor module or subsystem, a programmable integrated circuit, a programmable gate array, a digital signal processor (DSP), or another control or computing device. In certain embodiments, the one or more storage media 40 may be implemented as one or more non-transitory computer-readable or machine-readable storage media. In addition, in certain embodiments, the one or more storage media 40 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the processor-executable instructions and associated data of the analysis module(s) 36 may be provided on one computer-readable or machine-readable storage medium of the storage media 40, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 40 may be located either in the machine running the machine-readable instructions, or may be located at a remote site from which machine-readable instructions may be downloaded over a network for execution.

In certain embodiments, the processor(s) 38 may be connected to a network interface 42 of the surface control system 18 to allow the surface control system 18 to communicate with various surface sensors 44 and/or downhole sensors 46 described herein, as well as communicate with various actuators 48 and/or PLCs 50 of surface equipment 52 (e.g., surface pumps, valves, and so forth) and/or of downhole equipment 54 (e.g., the formation testing tool 10, electric submersible pumps, other downhole tools, and so forth) for the purpose of controlling operation of the oil and gas well system illustrated in FIG. 1. In certain embodiments, the network interface 42 may also facilitate the surface control system 18 to communicate data to a cloud-based service 56 (or other wired and/or wireless communication network) to, for example, archive the data or to enable external computing systems 58 (e.g., cloud-based computing systems, in certain embodiments) to access the data and/or to remotely interact with the surface control system 18. For example, in certain embodiments, some or all of the analysis modules 36 described in greater detail herein may be executed via cloud and edge deployments.

In certain embodiments, the surface control system 18 may include a display 60 configured to display a graphical user interface to present results on the control of the formation testing operations described herein. In addition, in certain embodiments, the graphical user interface may present other information to operators of the equipment 52, 54 described herein. For example, the graphical user interface may include a dashboard configured to present visual information to the operators. In certain embodiments, the dashboard may show live (e.g., real-time) data as well as the results of the control of the formation testing operations described herein.

In addition, in certain embodiments, the surface control system 18 may include one or more input devices 62 configured to enable operators to, for example, provide commands to the equipment 52, 54 described herein. For example, in certain embodiments, the formation testing tool 10 may provide information to the operators regarding the formation testing operations, and the operators may implement actions relating to the formation testing operations by manipulating the one or more input devices 62, as described in greater detail herein. In certain embodiments, the display 60 may include a touch screen interface configured to receive inputs from operators. For example, an operator may directly provide instructions to the formation testing tool 10 via the user interface, and the instructions may be output to the formation testing tool 10 via a controller and a communication system of the formation testing tool 10.

It should be appreciated that the surface control system 18 illustrated in FIG. 2 is only one example of a well control system, and that the surface control system 18 may have more or fewer components than shown, may combine additional components not depicted in the embodiment of FIG. 2, and/or the surface control system 18 may have a different configuration or arrangement of the components depicted in FIG. 2. In addition, the various components illustrated in FIG. 2 may be implemented in hardware, software, or a combination of both hardware and software, including one or more signal processing and/or application specific integrated circuits. Furthermore, the operations of the surface control system 18 as described herein may be implemented by running one or more functional modules in an information processing apparatus such as application specific chips, such as application-specific integrated circuits (ASICs), field-programmable gate arrays (FPGAs), programmable logic devices (PLDs), systems on a chip (SOCs), or other appropriate devices. These modules, combinations of these modules, and/or their combination with hardware are all included within the scope of the embodiments described herein.

Figure 3:
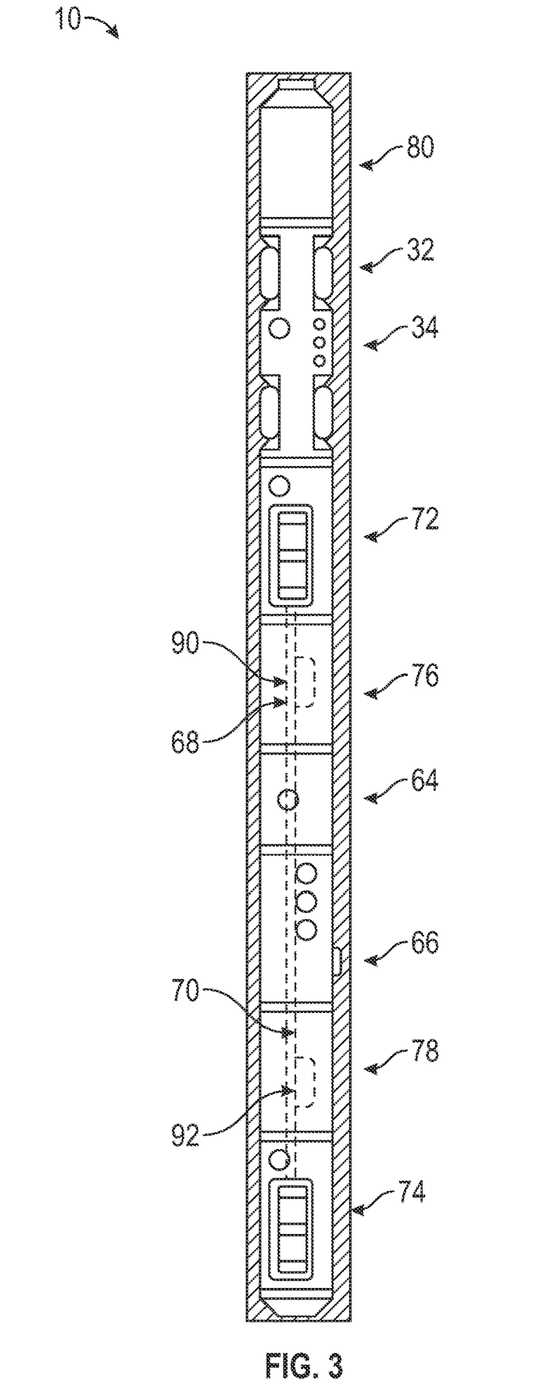
FIG. 3 is a side view of a formation testing tool, in accordance with embodiments of the present disclosure.

As described above, the embodiments described herein include a formation testing tool 10 configured to perform reservoir fluid analysis by drawing in formation fluid and testing the formation fluid downhole and/or collecting a sample of the formation fluid to bring to the surface. For example, in certain embodiments, the formation testing tool 10 may use a probe and/or packers to isolate a desired region of the wellbore 12 (e.g., at a desired depth) and establish fluid communication with the subterranean formation 14 surrounding the wellbore 12. The probe may draw the formation fluid into the formation testing tool 10. For example, FIG. 3 is a side view of a formation testing tool 10. As illustrated in FIG. 3, the formation testing tool 10 may include a hydraulic module 64 configured to control the flow of fluid through fluid lines of the formation testing tool 10, and a probe 66 that includes one or more inlets for receiving the fluid through the fluid lines of the formation testing tool 10. In certain embodiments, the probe 66 may include multiple inlets (e.g., a sampling probe and a guard probe) that may be used for the sampling described herein. In such embodiments, the probe 66 may be connected to sampling flowlines 68, as well as to guard flowlines 70. In certain embodiments, the probe 66 may be movable between extended and retracted positions for selectively engaging the wellbore 12 and acquiring fluid samples from the formation 14. In addition, in certain embodiments, a sampling pump module 72 and a guard pump module 74 configured to aid the flow of the fluid through the respective flowlines 68, 70.

As described in greater detail herein, the formation testing tool 10 also includes a fluid analysis module 28 configured to analyze the fluid flowing through the flowlines 68, 70. In particular, the fluid analysis module 28 may include a sampling fluid analyzer 76 and a guard fluid analyzer 78 configured to analyze the fluid flowing through the respective flowlines 68, 70. As described in greater detail herein, the sampling fluid analyzer 76 and the guard fluid analyzer 78 of the fluid analysis module 28 may be configured to differentiate dew point fluids flowing through the respective flowlines 68, 70 from bubble point fluids flowing through the respective flowlines 68, 70. In addition, as described above, the formation testing tool 10 includes one or more fluid collecting chambers 32, 34 configured to store the fluid samples. In addition, in certain embodiments, the formation testing tool 10 may include a power cartridge 80 configured to receive electrical power from the cable 16 and supply suitable voltages to the electronic components of the formation testing tool 10.

Figure 4:
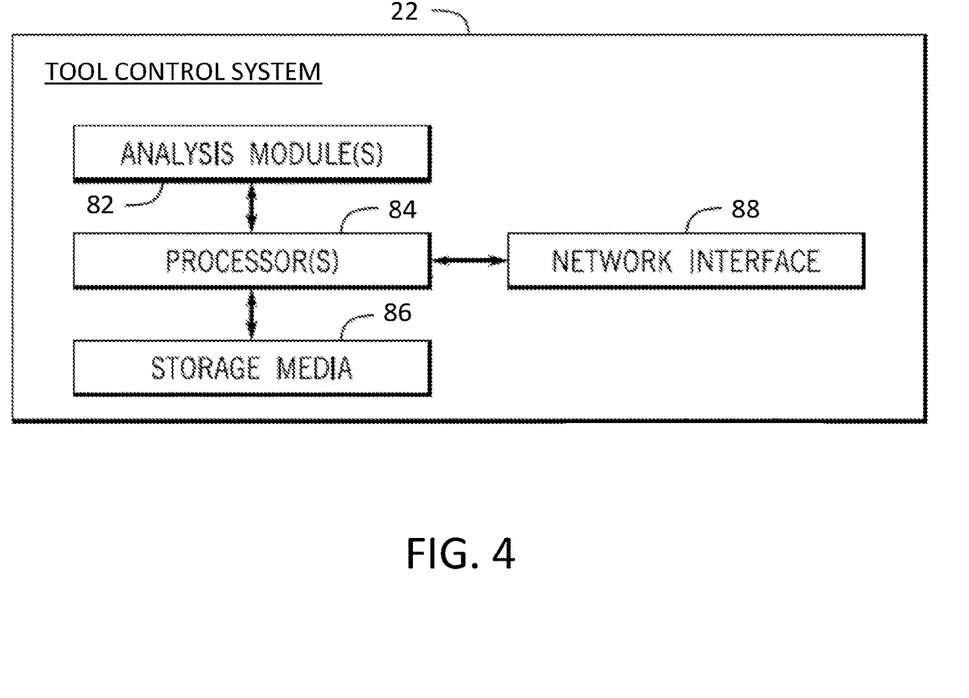
FIG. 4 illustrates an embodiment of a tool control system illustrated in FIG. 1, in accordance with embodiments of the present disclosure.

In addition, as described above, the formation testing tool 10 includes a tool control system 22 (as shown in FIG. 4) that controls the local functionality of the formation testing tool 10. In certain embodiments, the tool control system 22 of the formation testing tool 10 may communicate with the surface control system 18 such that the control systems 18, 22 collectively control operation of the formation testing tool 10. As will be appreciated, the tool control system 22 of the formation testing tool 10 may include components that are substantially similar to the components of the surface control system 18 illustrated in FIG. 2, other than the display 60 and the input devices 62.

FIG. 4 illustrates an embodiment of the tool control system 22 illustrated in FIG. 1. In certain embodiments, the tool control system 22 may include one or more analysis modules 82 (e.g., a program of processor executable instructions and associated data) that may be configured to perform various functions of the embodiments described herein. In certain embodiments, to perform these various functions, an analysis module 82 executes on one or more processors 84 of the tool control system 22, which may be connected to one or more storage media 86 of the tool control system 22. Indeed, in certain embodiments, the one or more analysis modules 82 may be stored in the one or more storage media 86. It will be appreciated that the one or more analysis modules 82 of the tool control system 22 of the formation testing tool 10 may include the fluid analysis module 28 described herein, which is configured to differentiate dew point fluids from bubble point fluids, as described in greater detail herein.

In certain embodiments, the one or more processors 84 may include a microprocessor, a microcontroller, a processor module or subsystem, a programmable integrated circuit, a programmable gate array, a digital signal processor (DSP), or another control or computing device. In certain embodiments, the one or more storage media 86 may be implemented as one or more non-transitory computer-readable or machine-readable storage media. In addition, in certain embodiments, the one or more storage media 86 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; or other types of storage devices. Such computer-readable or machine-readable storage medium or media are considered to be part of an article (or article of manufacture), which may refer to any manufactured single component or multiple components. In addition, in certain embodiments, the processor(s) 84 may be connected to a network interface 88 of the tool control system 22 to allow the tool control system 22 to communicate with the surface control system 18.

As described in greater detail herein, the formation testing platform described herein performs various specific analysis including, but not limited to, differentiating dew point fluids from bubble point fluids downhole using the fluid analysis module 28 of the formation testing tool 10. Returning now to FIG. 3, in certain embodiments, after isolating formation fluids in the flowlines 68, 70 of the formation testing tool 10, the hydraulic module 64 of the formation testing tool 10 may be used to reduce flowline pressure (i.e., decompressing the flowline 68, 70). In certain embodiments, the flow rate used may be in a range of 0.1 cubic centimeters per second (cc/sec) to 0.5 cc/sec, depending on the oil compressibility and the isolated flowline volume, although higher flow rates may be used for more compressible fluids and for larger decompression volumes. For example, in certain embodiments, when multiple fluid collecting chambers 32, 34 are coupled to the flowlines 68, 70 to decompress with relatively light fluids, flow rates between 0.5 cc/sec and 5.0 cc/sec may be more suitable. Similarly, smaller decompression volumes and lower compressibility fluids will require lower flowrates. A target decompression rate of roughly 10 pounds per square inch per second (psi/sec) to 50 psi/sec may ensure that the decompression does not last more than a few minutes. This timeframe of minutes ensures isothermal conditions and minimizes interference with the formation testing operation. The temperature change observed during such decompression experiments has been observed to be well below 0.5 degrees C.

To ensure that the phase change is detected, dual-flowline optical spectrometers 90, 92 may be used (e.g., as part of the fluid analyzers 76, 78 of the fluid analysis module 28) to interrogate the flowline 68, 70 at a 64 millisecond (ms) sampling rate. During decompression, the flowline pressure may drop uniformly as there are no pressure restrictions in the flowlines 68, 70, although there may be a hydrostatic head effect.

When a bubble point fluid reaches its bubble point, the first mobile bubbles in the fluid may not necessarily be formed in the spectrometer 90, 92, but likely above and below the spectrometer 90, 92. When the bubbles created below the spectrometer 90, 92 become mobile, they will migrate upward and generate high amplitude scattering as they pass through the spectrometer 90, 92.

Particularly in lighter fluids, an initial small and gradual wavelength independent outer diameter (OD) increase is often observed preceding high amplitude scattering. Close to the bubble point, heterogeneous nucleation, such as bubble growth on a sapphire window (e.g., of the spectrometers 90, 92), is often preferred over homogeneous nucleation. The magnitude of the OD change implies bubble sizes that are consistent with wavelength independent light scattering and are caused by bubbles that are growing; the initial slow temporal evolution of the signal implies that these detected bubbles remain attached to the optical spectrometer sapphire window, and have not yet detached. After an initial OD increase, the OD could also drop slightly as the first bubble can slowly migrate up while attached to the window. Eventually, with sufficient size, the bubble will detach from the window leading to rapid OD changes with time.

Figure 5:
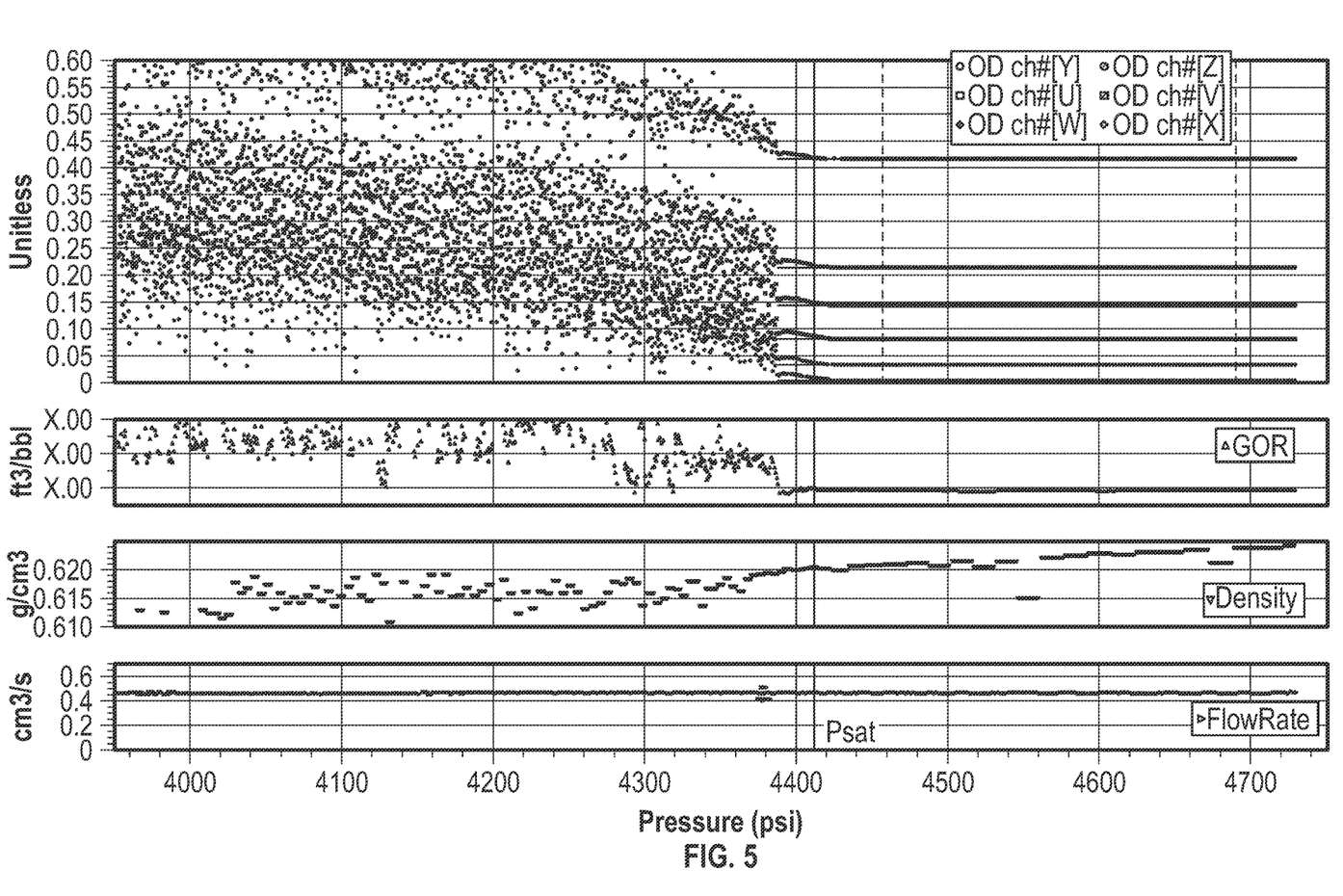
FIGS. 5 and 6 illustrate examples where wavelength independent scattering precedes high amplitude scattering, in accordance with embodiments of the present disclosure.
Figure 6:
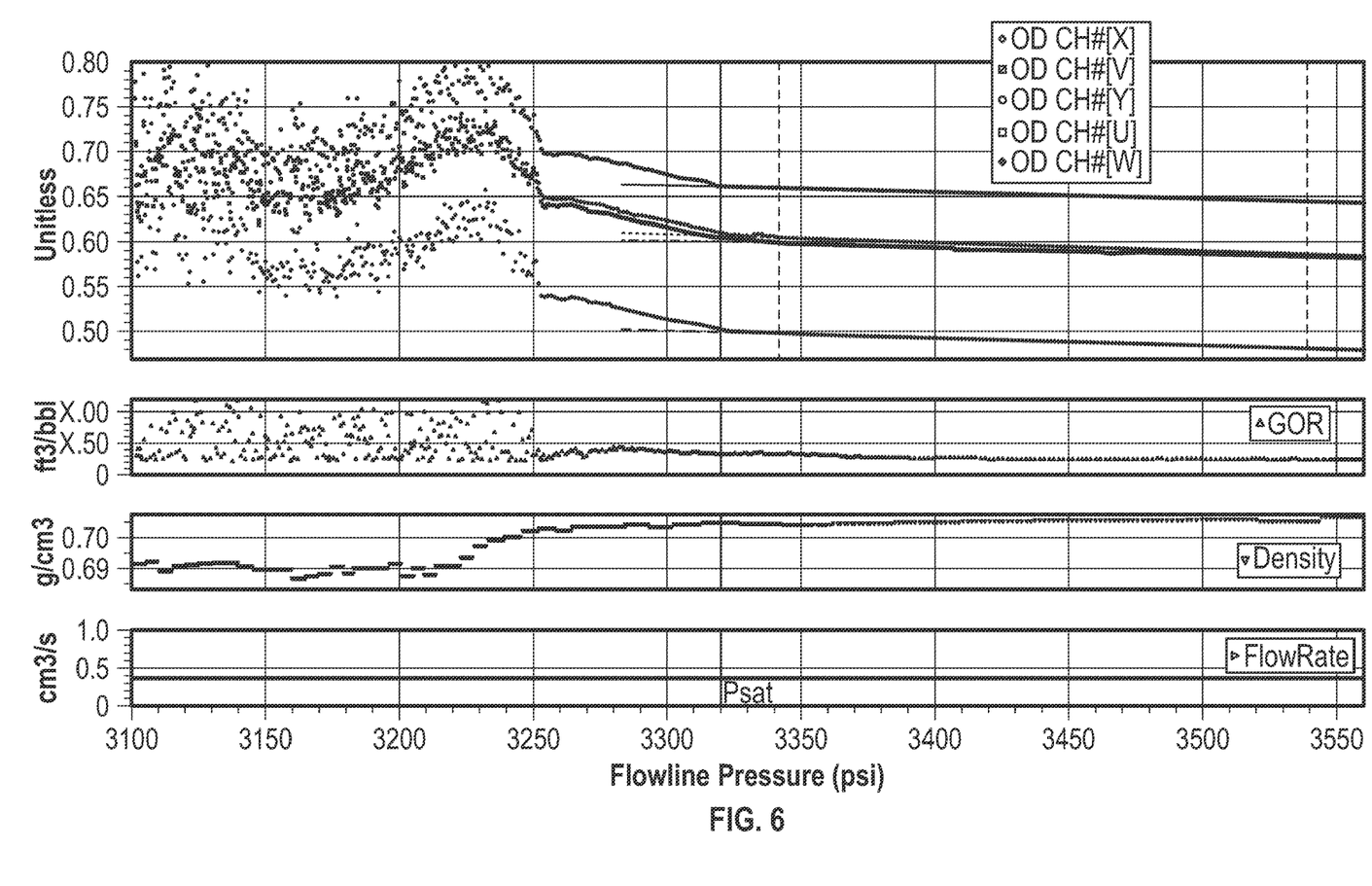

For lighter oils, the amount of gas coming out of solution increases with decreasing pressure as heavier gas components require lower pressures to be liberated. In addition, lighter oils often have higher saturation pressures giving a range of liberation pressures for these lighter hydrocarbons. For lower GOR (e.g., black) oils, there is less dissolved gas, and often less gas component variability, methane dominates. In addition, the saturation pressures of these oils are lower, limiting the range of liberation pressures for the gas component. Thus, the increase of gas liberation with a decreasing pressure below the bubble point is often not significant. Therefore, the high amplitude scattering will potentially increase more gradually for light oil, while it can be more abrupt for black oil. FIGS. 5 and 6 illustrate examples where wavelength independent scattering (i.e., indicated by the red vertical line) precedes high amplitude scattering.

Figure 7:
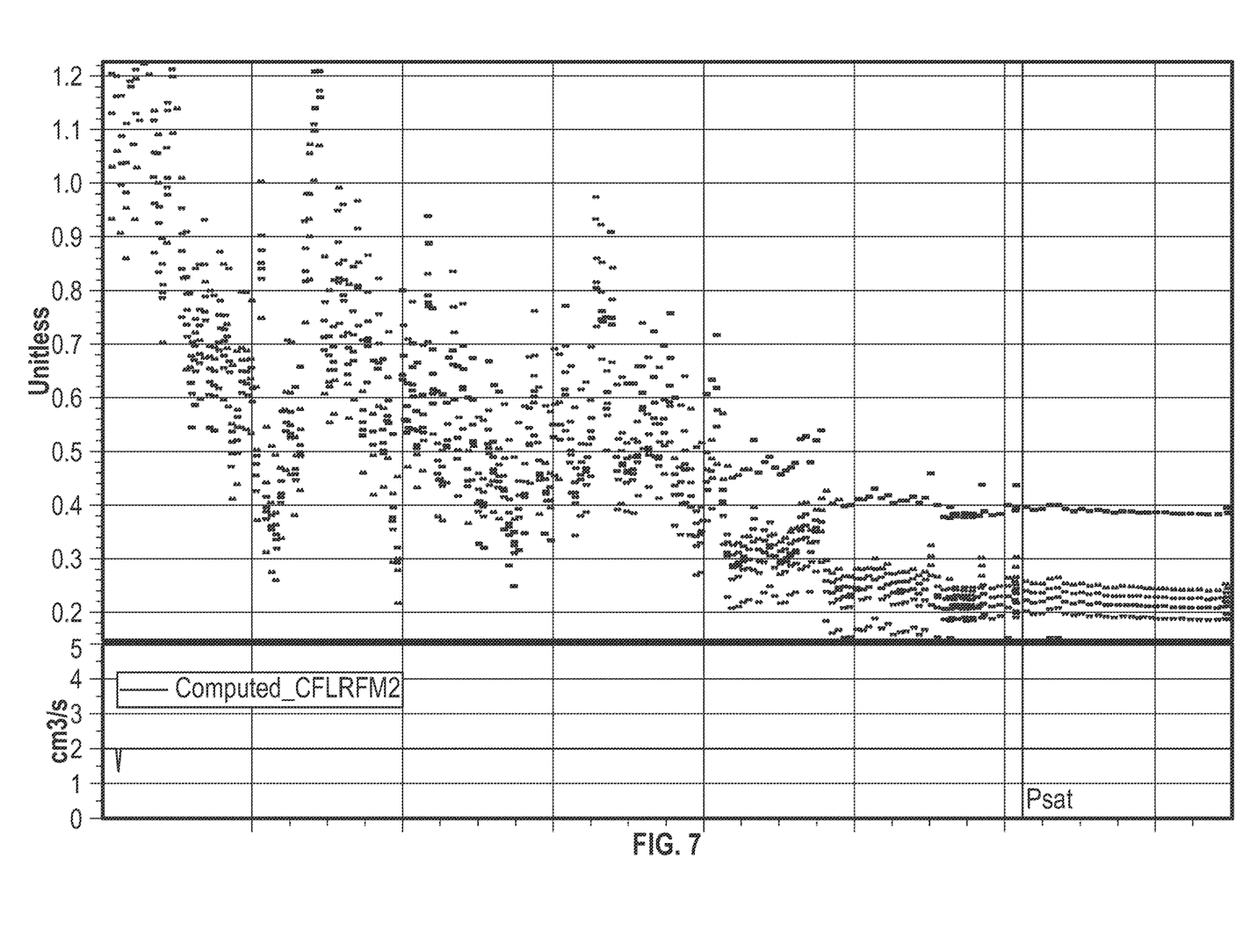
FIG. 7 illustrates an example of dew point detection during flowline depressurization in the formation testing tool, in accordance with embodiments of the present disclosure.

When a dew point fluid reaches its dew point, the first small dew droplets start to be formed in the flowline 68, 70. The dew drops disappear when the depressurization is stopped, as the drops either rain down and/or wet a surface forming a film. That is, there is no bubble of dew that adheres to a window in contrast to gas bubbles in light fluids. The dew drop quickly wets the surface; the contact angle of dew on sapphire in the presence of gas is nearly zero. For high GOR fluids, this difference enables identification of bubble point fluids versus dew point fluids. As depressurization continues, the dew drops appear again. Dew is visible in the optical spectrometer 90, 92 as scattering. FIG. 7 illustrates an example of dew point detection during flowline depressurization in the formation testing tool 10. It should be noted that there may also be a rate dependency with dew point pressure detection that will not be visible with bubble point fluids.

Figure 8:
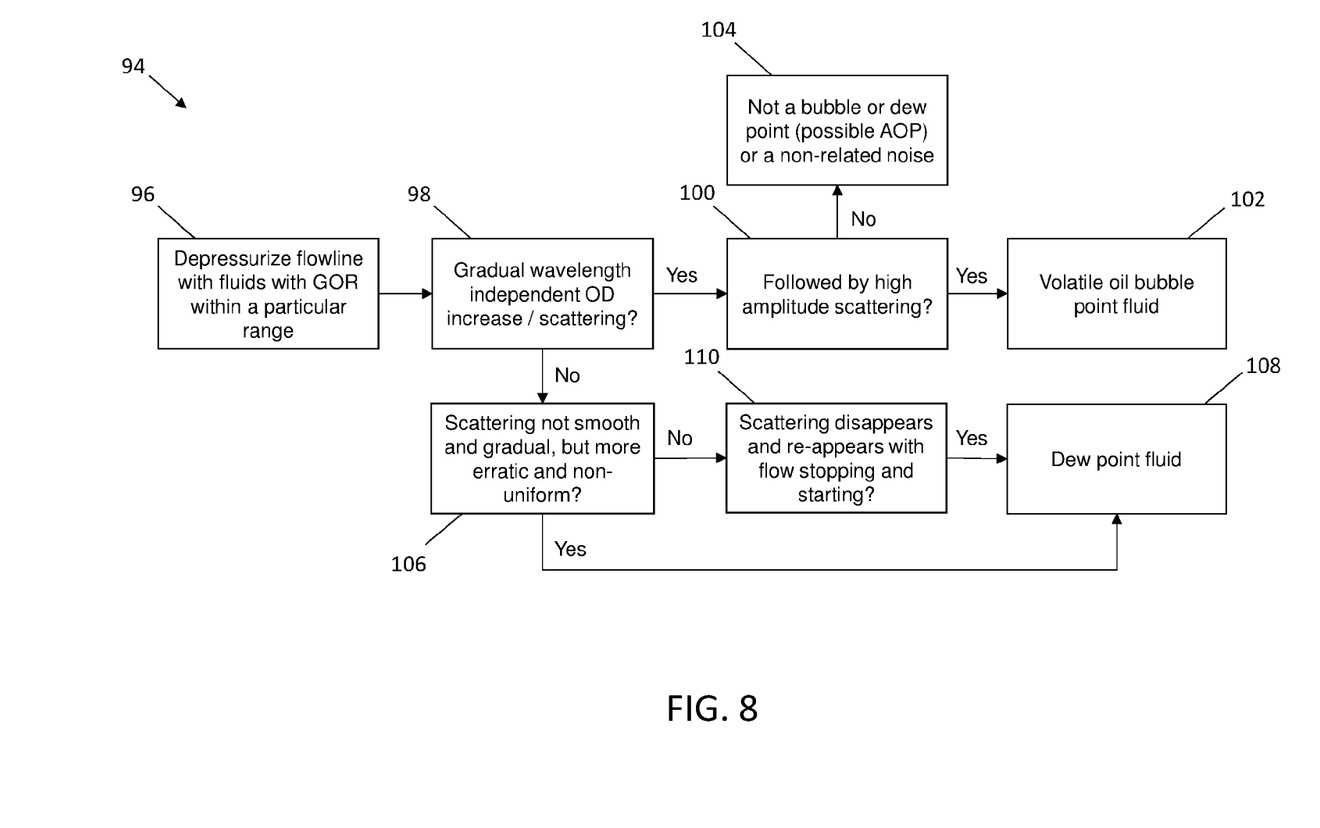
FIG. 8 is a flow diagram of a process for differentiating whether formation fluids being tested by the formation testing tool are bubble point fluids or dew point fluids, in accordance with embodiments of the present disclosure.

FIG. 8 is a flow diagram of a process 94 for differentiating whether formation fluids being tested by the formation testing tool 10 (e.g., using the fluid analyzers 76, 78 of the fluid analysis module 28) are bubble point fluids or dew point fluids. As illustrated, in certain embodiments, the process 94 begins with the depressurizing flowlines 68, 70 that contain a formation fluid having a GOR within a particular range (e.g., between 2,500 scf/bbl and 5,000 scf/bbl) (block 96). Then, the fluid analysis module 28 may determine whether a wavelength independent OD is gradually increasing and scattering (block 98). If the wavelength independent OD is gradually increasing and scattering, the fluid analysis module 28 may then determine whether the increasing and scattering wavelength independent OD is followed by relatively high amplitude scattering (block 100). If the gradually increasing and scattering wavelength independent OD (i.e., block 98) is followed by relatively high amplitude scattering, then the fluid analysis module 28 may determine that the formation fluid being tested is a volatile oil bubble point fluid by, for example, determining a bubble point pressure (block 102). Conversely, if the increasing and scattering wavelength independent OD (i.e., block 98) is not followed by relatively high amplitude scattering, then the fluid analysis module 28 may determine that the formation fluid being tested is not a bubble point fluid or a dew point fluid (block 104).

However, if the fluid analysis module 28 determines in block 98 that the wavelength independent OD is not gradually increasing and scattering, the fluid analysis module 28 may determine whether the scattering is not smooth and gradual, but rather more erratic and non-uniform (block 106). If the fluid analysis module 28 determines that the scattering is more erratic and non-uniform, then the fluid analysis module 28 may determine that the formation fluid being tested is a dew point fluid by, for example, determining a dew point pressure (block 108). However, if the fluid analysis module 28 determines that the scattering is relatively smooth and gradual, then the fluid analysis module 28 may determine whether the scattering disappears and reappears with flow stopping and starting (block 110). If the fluid analysis module 28 determines that the scattering does disappear and reappear with flow stopping and starting, then the fluid analysis module 28 may determine that the formation fluid being tested is a dew point fluid by, for example, determining a dew point pressure (block 108).

Further, in one or more embodiments, the process 94 may further include positioning a formation testing tool within a wellbore at a zone of interest and extracting the formation fluid from a subterranean formation. The formation fluid is extracted into the flowline of the formation testing tool, and the flowline is coupled to the fluid analysis module such that a portion of the formation fluid within the flowline is within the fluid analysis module. The fluid analysis module may include one or more optical spectrometers, and the process 94 may further include disposing a portion of the formation fluid within the one or more optical spectrometers of the fluid analysis module. Furthermore, the distribution of bubbles within the formation fluid may be detected by the one or more optical spectrometers. Additionally, the distribution of the bubbles within the formation fluid may be detected and analyzed while the formation testing tool is within the wellbore.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
   depressurizing a flowline via a hydraulic module of a formation testing tool, wherein the flowline contains a formation fluid;
   detecting a phase change within the formation fluid via at least one spectrometer configured to identify bubbles or dew drops in the formation fluid that are caused by depressurization of the flowline; and
   determining whether the formation fluid is a bubble point fluid, a dew point fluid, or neither the bubble point fluid nor the dew point fluid via a fluid analysis module of the formation testing tool, the fluid analysis module in communication with the at least one spectrometer and configured to analyze the bubbles or dew drops identified by the at least one spectrometer,
   wherein determining that the formation fluid is neither the bubble point fluid nor the dew point fluid comprises:
      determining, via the fluid analysis module, that a wavelength independent outer diameter of the bubbles in the formation fluid is increasing and scattering; and
      determining, via the fluid analysis module, that the increasing and scattering wavelength independent outer diameter is not followed by high amplitude scattering.

2. The method of claim 1, wherein the formation fluid has a gas-to-oil ratio (GOR) within a predetermined GOR range of between 2,500 standard cubic feet of gas per barrel of oil (scf/bbl) and 5,000 scf/bbl.

3. The method of claim 1, wherein determining that the formation fluid is the bubble point fluid comprises determining a bubble point pressure based on:
   determining, via the fluid analysis module, that the wavelength independent outer diameter of the bubbles in the formation fluid is increasing and scattering; and
   determining, via the fluid analysis module, that the increasing and scattering wavelength independent outer diameter is followed by high amplitude scattering.

4. The method of claim 1, wherein determining that the formation fluid is the dew point fluid comprises determining a dew point pressure based on:
   determining, via the fluid analysis module, that the wavelength independent outer diameter of the bubbles in the formation fluid is not increasing and scattering; and
   determining, via the fluid analysis module, that the scattering is erratic and non-uniform.

5. The method of claim 1, wherein determining that the formation fluid is the dew point fluid comprises determining a dew point pressure based on:
   determining, via the fluid analysis module, that the wavelength independent outer diameter of the bubbles in the formation fluid is not increasing and scattering;
   determining, via the fluid analysis module, that the scattering is smooth and gradual; and
   determining, via the fluid analysis module, that the scattering disappears and reappears with flow stopping and starting.

6. The method of claim 1, further comprising:
positioning the formation testing tool within a wellbore at a zone of interest; and
extracting the formation fluid from a subterranean formation.

7. The method of claim 6, wherein whether the formation fluid is the bubble point fluid, the dew point fluid, or neither the bubble point fluid nor the dew point fluid is determined by analyzing the distribution of bubbles in the formation fluid that are caused by depressurization of the flowline while the formation testing tool is within the wellbore.

8. The method of claim 6, wherein:
the formation fluid is extracted into the flowline of the formation testing tool; and
the flowline is coupled to the fluid analysis module such that a portion of the formation fluid within the flowline is within the fluid analysis module.

9. The method of claim 8, wherein the fluid analysis module comprises an optical spectrometer.

10. The method of claim 1, wherein:
the fluid analysis module comprises an optical spectrometer; and
the distribution of bubbles within the formation fluid is detected by the optical spectrometer.

11. The method of claim 1, wherein whether the formation fluid is the bubble point fluid, the dew point fluid, or neither the bubble point fluid nor the dew point fluid is determined by analyzing the distribution of bubbles in the formation fluid that are caused by the depressurization of the flowline when the flowline is within a wellbore.

12. A formation testing tool, comprising:
a flowline configured to receive a formation fluid;
a hydraulic module configured to depressurize a flowline of the formation testing tool;
at least one optical spectrometer configured to detect a phase change within the formation fluid caused by the depressurization of the flowline; and
a fluid analysis module in communication with the at least one spectrometer and configured to determine, based on the phase change detected by the at least one spectrometer, whether the formation fluid is a bubble point fluid, a dew point fluid, or neither the bubble point fluid nor the dew point fluid wherein determining that the formation fluid is neither the bubble point fluid nor the dew point fluid comprises:
determining, via the fluid analysis module, that a wavelength independent outer diameter of bubbles in the formation fluid is gradually increasing and scattering; and
determining, via the fluid analysis module, that the gradually increasing and scattering wavelength independent outer diameter is not followed by relatively high amplitude scattering.

13. The formation testing tool of claim 12, wherein the hydraulic module is configured to depressurize the flowline of the formation testing tool when the formation fluid has a gas-to-oil ratio (GOR) within a predetermined GOR range of between 2,500 standard cubic feet of gas per barrel of oil (scf/bbl) and 5,000 scf/bbl.

14. The formation testing tool of claim 12, wherein the fluid analysis module is configured to determine that the formation fluid is the bubble point fluid by determining a bubble point pressure based on:
determining, via the fluid analysis module, that the wavelength independent outer diameter of the bubbles in the formation fluid is increasing and scattering; and
determining, via the fluid analysis module, that the increasing and scattering wavelength independent outer diameter is followed by high amplitude scattering.

15. The formation testing tool of claim 12, wherein the fluid analysis module is configured to determine that the formation fluid is the dew point fluid by determining a dew point pressure based on:
determining, via the fluid analysis module, that the wavelength independent outer diameter of the bubbles in the formation fluid is not increasing and scattering; and
determining, via the fluid analysis module, that the scattering is erratic and non-uniform.

16. The formation testing tool of claim 12, wherein the fluid analysis module is configured to determine that the formation fluid is the dew point fluid by determining a dew point pressure based on:
determining, via the fluid analysis module, that the wavelength independent outer diameter of the bubbles in the formation fluid is not increasing and scattering;
determining, via the fluid analysis module, that the scattering is smooth and gradual; and
determining, via the fluid analysis module, that the scattering disappears and reappears with flow stopping and starting.

\* \* \* \* \*